US009789579B2

(12) United States Patent
Fukushima et al.

(10) Patent No.: US 9,789,579 B2
(45) Date of Patent: Oct. 17, 2017

(54) APPARATUS FOR DETECTING RAMMER TIP-OVER

(71) Applicant: HONDA MOTOR CO., LTD., Tokyo (JP)

(72) Inventors: Kohei Fukushima, Wako (JP); Takamasa Takeshige, Wako (JP); Yasunori Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 765 days.

(21) Appl. No.: 14/022,495

(22) Filed: Sep. 10, 2013

(65) Prior Publication Data
US 2014/0076596 A1    Mar. 20, 2014

(30) Foreign Application Priority Data
Sep. 20, 2012    (JP) .................... 2012-207469

(51) Int. Cl.
*B23Q 11/00*    (2006.01)
*F02D 45/00*    (2006.01)
(Continued)

(52) U.S. Cl.
CPC ...... *B23Q 11/0092* (2013.01); *B23Q 11/0078* (2013.01); *B23Q 11/0085* (2013.01);
(Continued)

(58) Field of Classification Search
CPC ... E02F 9/24; E02F 9/264; E02F 9/267; F02B 77/08; F02D 41/042; F02D 45/00;
(Continued)

(56) References Cited

U.S. PATENT DOCUMENTS 3,900,013 A * 8/1975 Vignozzi ............... F02P 5/045
123/335
4,086,532 A * 4/1978 Aronson ............... G01P 3/489
324/161
(Continued)

FOREIGN PATENT DOCUMENTS

JP    2011-226319    11/2011
WO    2009/095986    8/2009

OTHER PUBLICATIONS

European Search Report dated Mar. 27, 2014, 4 pages.

*Primary Examiner* — Hemant M Desai
*Assistant Examiner* — Eduardo R Ferrero
(74) *Attorney, Agent, or Firm* — Rankin, Hill & Clark LLP (57) ABSTRACT

In an apparatus for detecting tip-over of a rammer equipped with a crankcase accommodating an output shaft rotatably connected to an engine, a movable unit accommodating a converter mechanism for converting rotation of the output shaft to vertical motion of a movable member, a tamping shoe connected to the movable unit, and a handle operable by an user, and adapted to thrust upward in the gravitational direction by the vertical motion of the movable member and go into a free fall to compact a ground surface, it is determined whether a detected engine speed becomes equal to or smaller than a threshold value set lower than an engine idling speed when the engine has been operated at a rammer working speed set greater than the engine idling speed, and if it does, it is discriminated that the rammer has tipped over.

9 Claims, 5 Drawing Sheets (51) Int. Cl.
  *E01C 19/34* (2006.01)
  *E01C 19/35* (2006.01)
  *E02D 3/054* (2006.01)
  *F02D 41/04* (2006.01)
  *F02N 11/08* (2006.01)
  *F02N 11/10* (2006.01)
  *F02D 41/00* (2006.01)

(52) U.S. Cl.
  CPC .............. *E01C 19/34* (2013.01); *E01C 19/35* (2013.01); *E02D 3/054* (2013.01); *F02D 41/042* (2013.01); *F02D 45/00* (2013.01); *F02N 11/0818* (2013.01); *F02N 11/10* (2013.01); *B23Q 11/00* (2013.01); *B23Q 11/0089* (2013.01); *F02D 41/00* (2013.01); *F02D 2200/101* (2013.01); *F02D 2400/06* (2013.01); *Y02T 10/48* (2013.01)

(58) Field of Classification Search
  CPC ........... F02D 2200/101; F02D 2400/06; F02D 17/04; F02D 41/033; F02D 41/1498; F02D 2200/10; F02D 2200/1012; F02D 2200/1016; F02D 2200/1015; F02D 2200/1006; F02N 11/0818; F02N 11/10; E02D 3/054; B23Q 11/0092; B23Q 11/0078; B23Q 11/0085; B23Q 11/0089; Y02T 10/48; E01C 19/34
  USPC .......... 173/176; 404/133.05, 133.1; 701/110, 701/111, 112
  See application file for complete search history.

(56) References Cited

U.S. PATENT DOCUMENTS

| | | | | |
|---|---|---|---|---|
| 4,653,445 A * | 3/1987 | Book | ...................... | F02D 17/04 123/198 D |
| 4,681,075 A * | 7/1987 | Yamato | ................. | F02D 31/005 123/339.22 |
| 4,708,777 A * | 11/1987 | Kuraoka | ............ | F02D 41/1494 123/697 |
| 4,775,263 A * | 10/1988 | Persson | ................... | E01C 19/35 192/129 R |
| 4,823,067 A * | 4/1989 | Weber | ..................... | H02P 23/26 318/775 |
| 5,033,428 A * | 7/1991 | Sasaki | ..................... | F02D 41/22 123/198 D |
| 5,090,386 A * | 2/1992 | Kurosu | ................. | F02D 41/042 123/478 |
| 6,419,531 B1 * | 7/2002 | Nanami | ................ | B63B 35/731 123/198 D |
| 6,474,300 B1 * | 11/2002 | Steffen | ................... | E01C 19/30 123/198 D |
| 6,758,632 B2 * | 7/2004 | Hausler | ................... | F01M 1/12 184/109 |
| 6,850,023 B2 * | 2/2005 | Lau | ........................... | G01P 3/48 318/463 |
| 7,416,044 B2 * | 8/2008 | Tsuruta | .............. | B60R 16/0233 180/282 |
| 8,676,478 B2 * | 3/2014 | Nakai | ................... | B60W 10/06 123/179.4 |
| 8,997,472 B2 * | 4/2015 | Suzuki | ..................... | E02F 9/26 60/328 |
| 2002/0045391 A1 * | 4/2002 | Kanno | .................. | F02B 61/045 440/88 F |
| 2003/0113105 A1 * | 6/2003 | Lau | ........................... | G01P 3/48 388/800 |
| 2003/0132837 A1 * | 7/2003 | Hasegawa | ................ | G01C 9/06 340/440 |
| 2003/0231013 A1 * | 12/2003 | Faymon | .................. | G01P 3/489 324/166 |
| 2005/0221952 A1 * | 10/2005 | Tetsuno | .............. | F02N 11/0814 477/115 |
| 2006/0069495 A1 * | 3/2006 | Andersson | ............ | F02D 41/042 701/112 |
| 2007/0028897 A1 * | 2/2007 | Fukasawa | ............. | F02D 41/042 123/467 |
| 2007/0239328 A1 * | 10/2007 | Saposnik | .................. | E02F 9/24 701/29.2 |
| 2009/0012697 A1 * | 1/2009 | Nakamura | ............ | F02D 41/042 701/103 |
| 2009/0157284 A1 * | 6/2009 | Bayerle | ................. | F02D 41/042 701/112 |
| 2010/0284743 A1 * | 11/2010 | Steffen | .................... | E02D 3/046 404/133.05 |
| 2010/0303546 A1 * | 12/2010 | Fischer | ................. | E01C 19/288 404/72 |
| 2011/0253093 A1 | 10/2011 | Namba | | |

* cited by examiner

APPARATUS FOR DETECTING RAMMER TIP-OVER

TECHNICAL FIELD

Embodiments of this invention relate to an apparatus for detecting rammer tip-over, more specifically to an apparatus for stopping an engine upon detecting tip-over of a rammer used in construction work.

RELATED ART

A rammer is a well-known piece of construction equipment that comprises a movable unit accommodating a converter mechanism for converting rotation of an output shaft connected to and rotated by an engine to vertical motion in the gravitational direction of a movable member, a tamping shoe connected thereto and a handle operable by an operator, and that compacts a ground surface by applying impact force of the vertical motion of the movable member to the tamping shoe.

Under operation of the handle by the operator, the rammer compacts the ground using the impact force of the vertical motion of the movable member, thus making prompt detection of rammer tip-over and engine shutdown desirable. Therefore, Japanese Laid-Open Patent Application No. 2011-226319 proposes a technique of using a pressure sensor to detect whether oil is being discharged from the outlet of the engine oil pump, and when oil is not being discharged, deciding that the rammer tipped over and stopping the engine.

SUMMARY OF THE INVENTION

Although the technique set out in Patent Document 1 is configured to detect tip-over of the rammer and halt the engine, it requires a dedicated sensor constituted as a pressure sensor for detecting tip-over and therefore has the disadvantage of making the configuration more complicated. Another disadvantage is that a delay between tip-over detection and engine shutdown is needed for ensuring that oil pressure changes owing to vibration and tilting during normal operation are not mistaken as due to tip-over.

Therefore, the object of this invention is to overcome the foregoing problems by providing an apparatus for detecting rammer tip-over adapted to promptly detect rammer tip-over and shut down an engine without requiring a dedicated sensor.

In order to achieve the object, this invention provides in its first aspect an apparatus for detecting tip-over of a rammer equipped with an internal combustion engine, a crankcase accommodating an output shaft rotatably connected to the engine, a movable unit accommodating a converter mechanism for converting rotation of the output shaft to vertical motion of a movable member in a gravitational direction, a tamping shoe connected to the movable unit, and a handle operable by an user, and adapted to thrust upward in the gravitational direction by the vertical motion, of the movable member and go into a free fall to compact a ground surface with resulting impact force acting on the tamping shoe, comprising: an engine speed detection unit that detects a rotational speed of the engine; a rammer tip-over discrimination unit that determines whether the detected engine speed becomes equal to or smaller than a threshold value set lower than an engine idling speed when the engine has been operated at a rammer working speed set greater than the engine idling speed, and discriminates that the rammer has tipped over if the detected engine speed becomes equal to or smaller than the threshold value; and an engine shutdown unit that shuts down the engine when it is discriminated that the rammer has tipped over.

In order to achieve the object, this invention provides in its second aspect a method for detecting tip-over of a rammer equipped with an internal combustion engine, a crankcase accommodating an output shaft rotatably connected to the engine, a movable unit accommodating a converter mechanism for converting rotation of the output shaft to vertical motion of a movable member in a gravitational direction, a tamping shoe connected to the movable unit, and a handle operable by an user, and adapted to thrust upward in the gravitational direction by the vertical motion of the movable member and go into a free fall to compact a ground surface with resulting impact force acting on the tamping shoe, comprising the steps of: detecting a rotational speed of the engine; determining whether the detected engine speed becomes equal to or smaller than a threshold value set lower than an engine idling speed when the engine has been operated at a rammer working speed set greater than the engine idling speed; discriminating that the rammer has tipped over if the detected engine speed becomes equal to or smaller than the threshold value; and shutting down the engine when it is discriminated that the rammer has tipped over.

DETAILED DESCRIPTION OF THE EMBODIMENTS

Embodiments of the invention on the apparatus for detecting rammer tip-over according to this invention are explained with reference to the attached drawings in the following.

First Embodiment

Figure 1:
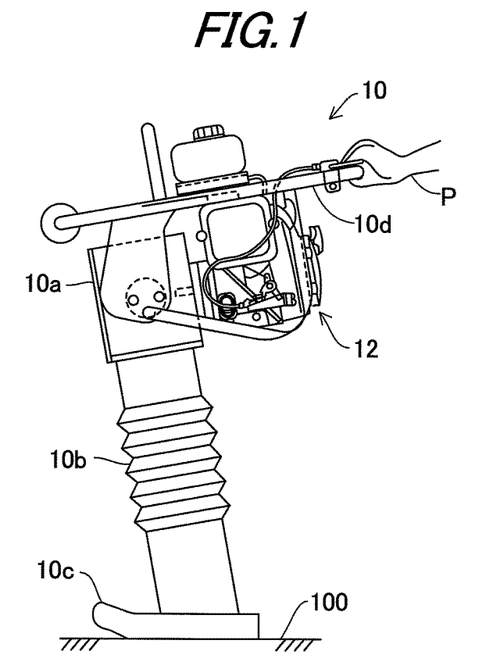
FIG. 1 is a side view of a rammer for application of an apparatus for detecting rammer tip-over according a first embodiment of this invention.
Figure 2:
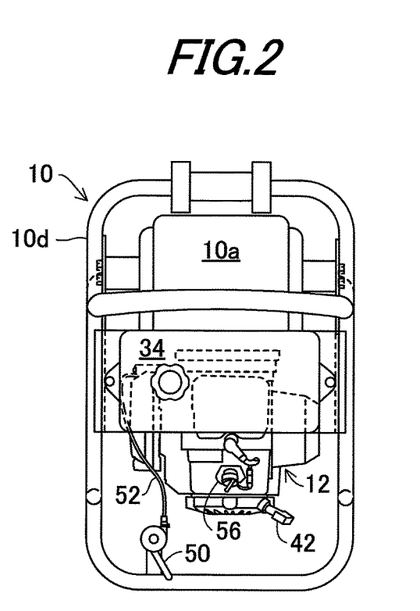
FIG. 2 is a top view of the rammer illustrated in FIG. 1.
Figure 3:
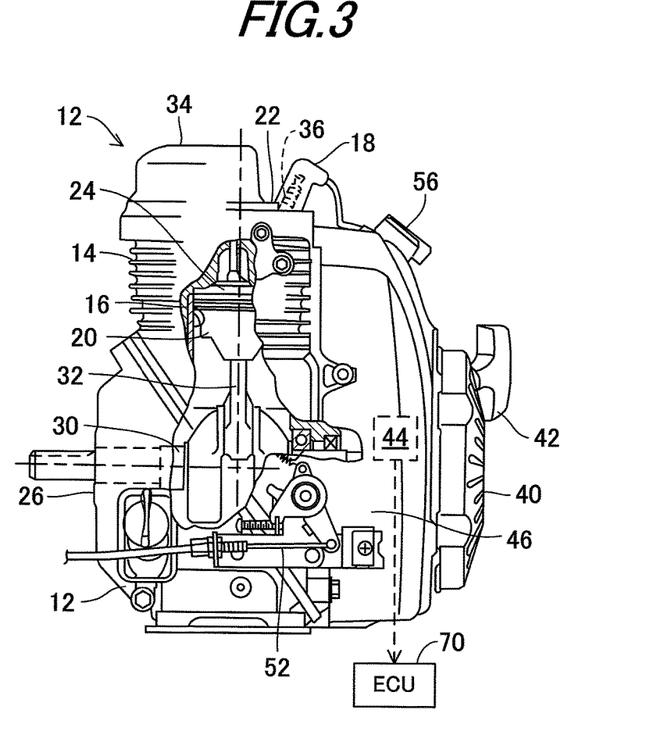
FIG. 3 is a (partial) front view of the rammer illustrated in FIG. 1.

FIG. 1 is a side view of a rammer for application of the apparatus for detecting rammer tip-over according a first embodiment of this invention, FIG. 2 is a top view of the rammer, and FIG. 3 is a (partial) front view of the rammer.

Symbol 10 in FIG. 1 designates a rammer. The rammer 10 is equipped with an engine 12, a crankcase 10a accommodating an output shaft (not shown) connected to and rotated by a crankshaft (not shown) of the engine 12 (i.e., an output shaft rotatably connected to the engine 12), a movable unit 10b accommodating a converter mechanism (not shown) for converting rotation of the output shaft to vertical motion of a movable member 10b in the gravitational direction, a tamping shoe 10c connected to the movable unit 10b, and a handle 10d operable by an operator P.

In the rammer 10, although not illustrated in the drawings, the converter mechanism converts the rotation of the output shaft connected to the crankshaft of the engine 12 to vertical motion (rectilinear reciprocating motion) of a piston or similar movable member. The movable member is connected to the tamping shoe 10c through an oscillation transmitting member comprising a piston connected to a piston rod, an inner cylinder housing a spring, and an outer cylinder sleeved thereon.

Owing to this structure, the rammer 10 is thrust upward in the gravitational direction by the vertical motion of the movable member, more specifically by the firing (combustion) of the engine 12, and then goes into a free fall to compact a ground surface 100 with the resulting impact force acting on the tamping shoe 10c.

The engine 12 is an air-cooled, 4-cycle, single-cylinder OHV engine fueled with gasoline that has a displacement of, say, around 100 cc, and is a general-purpose internal combustion engine used as a small equipment prime mover in the agricultural, building and other industries.

As shown distinctly in FIG. 3, a piston 20 is reciprocatably accommodated in a cylinder 16 formed inside a cylinder block 14 of the engine 12. A cylinder head 22 fastened to the top of the cylinder block 14 forms a combustion chamber 24 between itself and the head of the piston 20, while a crankcase 26 fastened to its bottom rotatably accommodates a crankshaft 30 therein. The crankshaft 30 is connected to the piston 20 through a connecting rod 32.

Intake air sucked in through an air cleaner (not shown) passes through an intake pipe (not shown), and an air-fuel mixture is formed by injecting fuel from a carburetor (not shown) connected to a fuel tank 34 through a fuel feed line. The produced air-fuel mixture is flow-rate regulated by a throttle valve (not shown) and passes into the combustion chamber 24 when an intake valve (not shown) opens.

Upon being ignited by a sparkplug 36, the air-fuel mixture passed into the combustion chamber 24 combusts to drive the piston 20. When an exhaust valve (not shown) opens, the exhaust gas produced by the combustion passes through an exhaust pipe (not shown) to be discharged to the exterior.

One end of the crankshaft 30 is connected to the output shaft of the rammer 10, and a flywheel (not shown) is attached to the other end. A cover 40 is attached outside the flywheel and a recoil starter 42 is provided near it for operable by the operator.

Further, a pulsar coil 44 is attached to the crankcase 26 at a position outward of the flywheel. A single magnet attached to the front surface side of the flywheel rotates relative to the pulsar coil 44, which, by cutting through the flux of the magnet, produces a single output at a predetermined crank angular position near the TDC (Top Dead Center) once per revolution (per 360 degrees) of the crankshaft 30.

Moreover, a generator coil (not shown) is attached at a location inside the crankcase 26 to function as an ACG (Alternating Current Generator) to produce electromotive force during rotation relative to a plurality of magnets attached to the rear surface side of the flywheel. A throttle lever 50 (shown in FIG. 2) is installed at a suitable location on a housing 46 of the engine 12 to be operable by the operator (user). The throttle lever 50 is connected to the throttle valve by a cable 52 or similar, and the throttle valve is driven in response to operator's manipulation to a fully closed position corresponding to idling speed (e.g., 1800 rpm) or a wide-open throttle position corresponding to rammer working speed (e.g., 3600 rpm).

Further, a main switch 56 is installed at a suitable location on the housing 46 of the engine 12 to be operable by the operator. When the main switch 56 is put in OFF position by the operator, an energy line of an ignition coil us grounded, thereby stopping the engine 12 and also stopping the rammer 10.

The output of the pulsar coil 44 is sent to an ECU (Electronic Control Unit) 70. The ECU 70 has a microcomputer constituted by a CPU, ROM, RAM and other devices, and functions as an apparatus for detecting rammer tip-over.

Figure 4:
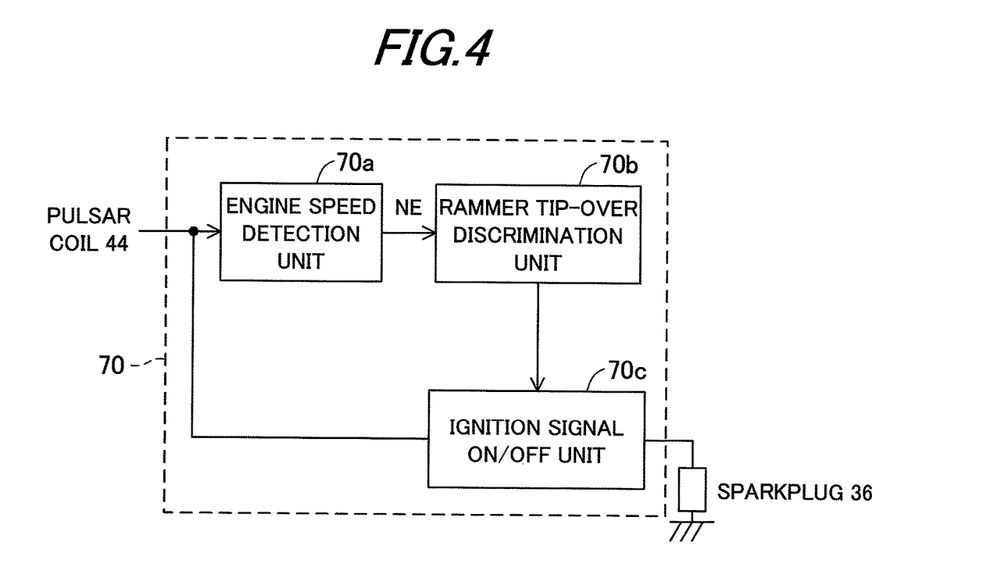
FIG. 4 is a block diagram showing the operations of an ECU illustrated in FIG. 3.

FIG. 4 is a block diagram showing the operations of the ECU 70.

As illustrated, the ECU 70 is equipped with an engine speed detection unit 70a, a rammer tip-over discrimination unit 70b, and an ignition signal ON/OFF unit (engine shutdown unit) 70c.

The engine speed detection unit 70a inputs the output of the pulsar coil 44, measures the time interval of the received outputs, and calculates and outputs the rotational speed of the engine 12.

The rammer tip-over discrimination unit 70b inputs the output of the engine speed detection unit 70a, discriminates whether the rammer 10 has tipped over based on the engine speed detected by the engine speed detection unit 70a, and when occurrence of tip-over is discriminated, turns the ignition signal OFF via the ignition signal ON/OFF unit 70c, thereby stopping supply of current to the sparkplug 36 (halting ignition).

Figure 5:
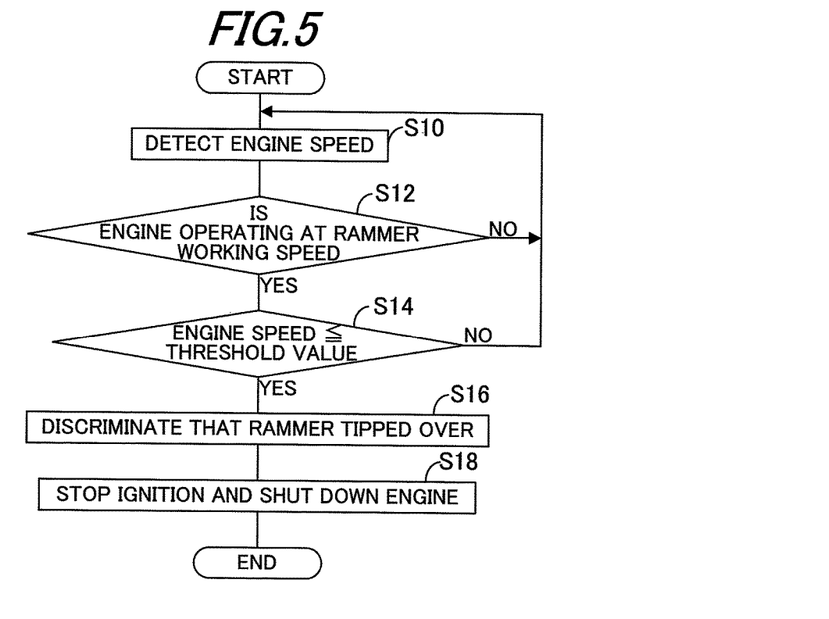
FIG. 5 is a flowchart showing operation of a rammer tip-over discrimination unit of the ECU illustrated in FIG. 3.
Figure 6:
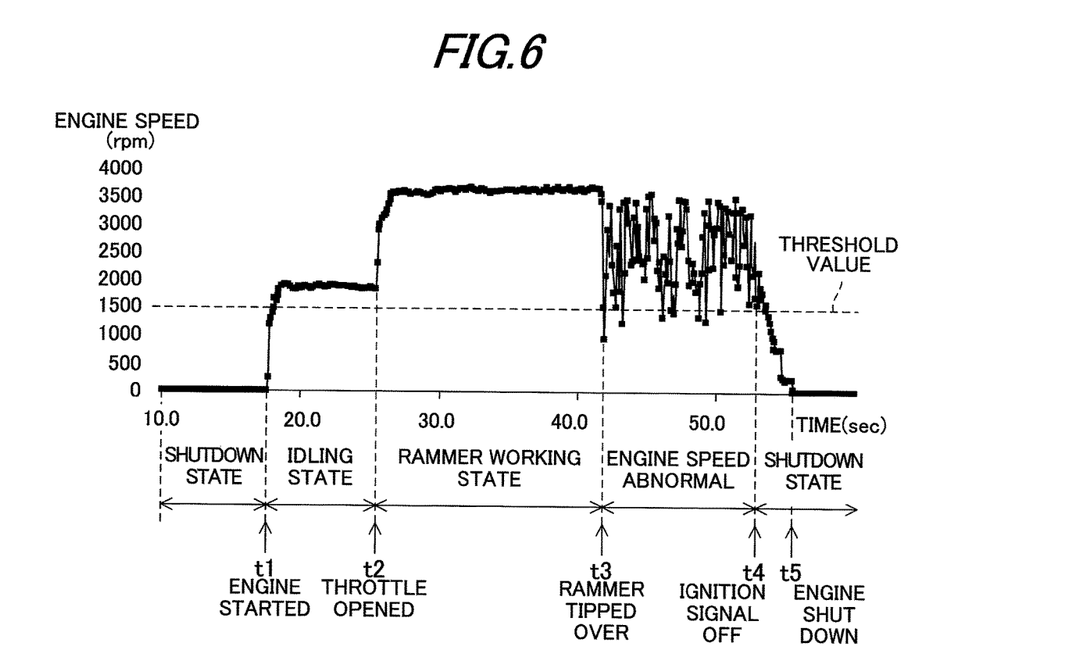
FIG. 6 is a time chart showing inventors' experimental data for explaining the operation of FIG. 5.
Figure 7:
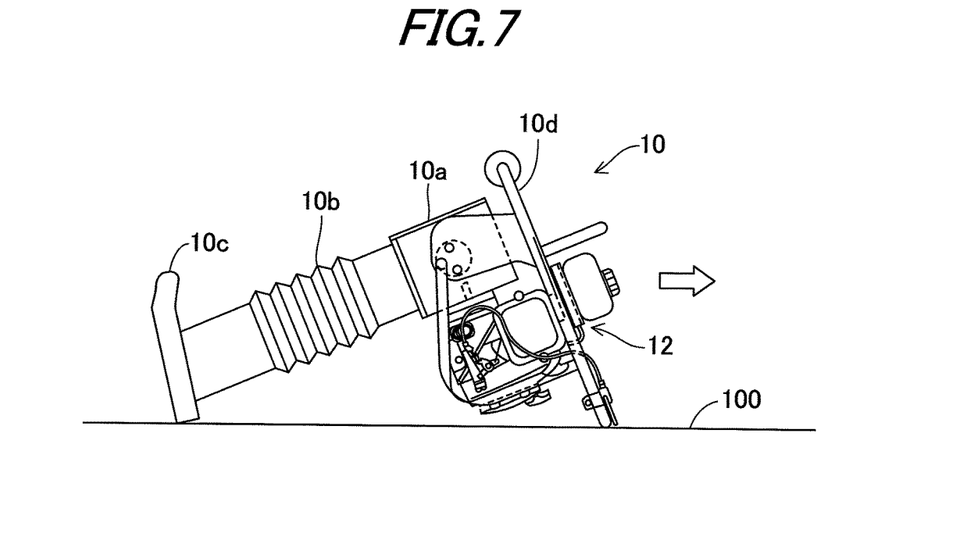
FIG. 7 is an explanatory diagram showing the behavior of a tipped-over rammer illustrated in FIG. 1.

FIG. 5 is a flowchart showing operation of the rammer tip-over discrimination unit 70b of the ECU 70 in detail (showing the operation of the apparatus according to this embodiment), FIG. 6 is a time chart showing inventors' experimental data for explaining the operation of FIG. 5, and FIG. 7 is an explanatory diagram showing the behavior of a tipped-over rammer.

The processing shown in the flowchart of FIG. 5 is commenced at time t1 in the time chart of FIG. 6, i.e., at the time the engine 12 starts upon operation of the recoil starter 42 by the operator.

An explanation follows: In S10, the engine speed is detected. This is done by reading the output of the engine speed detection unit 70a of FIG. 4.

Next, in S12, it is determined from the detected engine speed whether the engine 12 is operating at an engine speed greater (higher) than the idling speed (e.g., 1800 rpm), namely at the rammer working speed (e.g., 3600 rpm).

As shown in FIG. 6, after the engine 12 is started by the operator at time t1, and at suitable time later, e.g., at time t2, the throttle lever 50 will no doubt be operated by the operator to instruct a change in throttle opening from the fully closed position corresponding to the idling speed (e.g., 1800 rpm) to the wide-open throttle position corresponding to the rammer working speed (e.g., 3600 rpm). Accordingly, in S12, it is determined whether the engine speed is at that speed.

When the result in S12 is NO, the program returns to S10, and when YES, it proceeds to S14, in which it is determined whether the detected engine speed is at or below a threshold value (i.e., it has fallen to or below the threshold value). In other words, it is determined in S14 whether the detected engine speed becomes equal to or smaller than the threshold value. The threshold value is set at a value (e.g., 1500 rpm) smaller (lower) than the idling speed (e.g., 1800 rpm).

When the result in S14 is NO, the program returns to S10, and when YES, meaning that the engine speed was found to have fallen to or below the threshold value, it proceeds to S16, in which it is discriminated that the rammer 10, which should normally be in operation with the operator gripping the handle 10d, has in fact separated from the operator's hands and tipped over, and to S18, in which an ignition switch 62 is opened to stop the ignition of the engine 12 and the engine 12 is shut down.

The rammer 10 is detected to have tipped over when the result in S14 is YES because, as explained earlier, the inventors achieved this invention based on the finding that when the rammer 10 tips over, the engine speed sharply decreases, as shown at time t3 in the time chart of FIG. 6, from the rammer working speed (e.g., 3600 rpm) to or below the threshold value set at a value (e.g., 1500 rpm) lower than the idling speed (e.g., 1800 rpm).

It is thought that the rapid decrease of engine speed immediately after tip-over occurs because, as shown in FIG. 7, the motion of the movable unit 10b of the rammer 10 causes the tamping shoe 10c to kick into the ground surface 100, using the handle as the axis, and it is attributable to the resulting load. As far as the inventors could tell, the rammer 10 thereafter moves in the direction indicated by the arrow and ceases motion when the engine 12 stops.

Moreover, as shown in the time chart of FIG. 6, the engine speed falls to or below the threshold at time t3, and then repeats a behavior of rising toward the rammer working speed and reversing to fall toward the threshold again, whereafter the ignition is cut off at time t4 and the engine is stopped at time t5 to conclude the event.

Being configured as set out in the foregoing, the apparatus for detecting rammer tip-over according to the first embodiment makes it possible to detect engine speed with an already existing sensor used for control of the engine 12, so that the inconvenience of requiring a dedicated sensor does not arise, while it also makes it possible to promptly and accurately detect tip-over of the rammer 10 and promptly shut down the engine 12 because a configuration is adopted whereby tip-over of the rammer 10 is discriminated and the engine 12 is shut down when the detected engine speed is determined to have fallen to or below the threshold value set at a value lower than the idling speed.

Moreover, when the engine 12 is operating at the rammer working speed, which is greater than the idling speed, tip-over of the rammer 10 is detected by discriminating whether the engine speed has fallen to or below the threshold value, so that in a case where the operator deliberately lays the idling rammer 10 on its side for maintenance or the like, the engine 12 is not stopped owing to a false tip-over detection, thus ensuring that unnecessary tasks like restarting the engine 12 are avoided.

Second Embodiment

Figure 8:
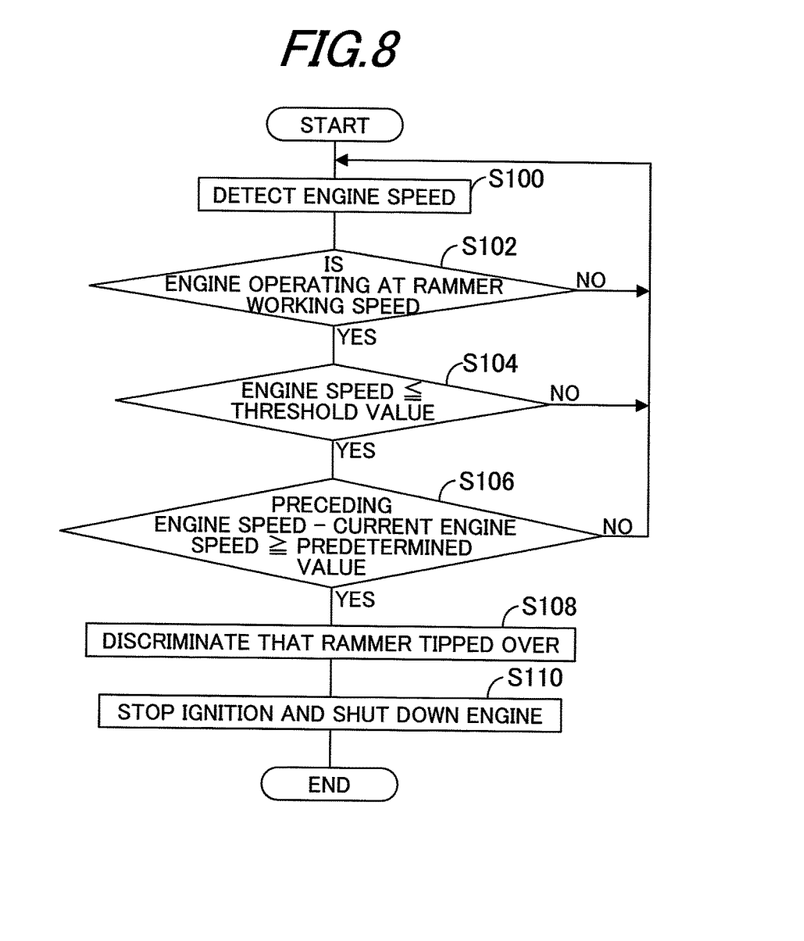
FIG. 8 is a flowchart, similar to FIG. 5, but showing the operation of an apparatus for detecting rammer tip-over according to a second embodiment of this invention.
Figure 9:
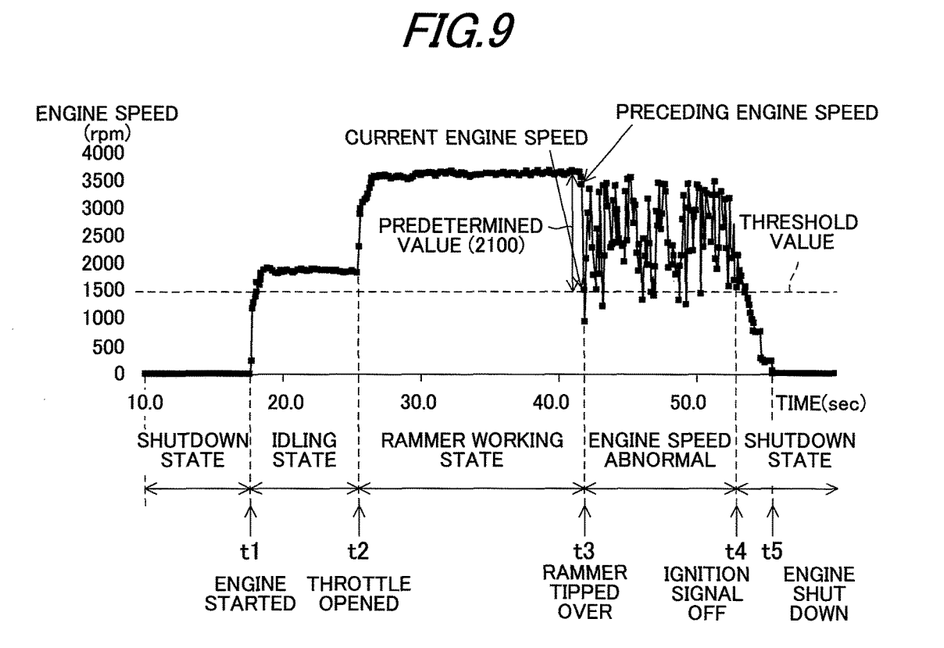
FIG. 9 is a time chart, similar to FIG. 6, but showing inventors' experimental data like that of FIG. 6 for explaining the operation of FIG. 8.

FIG. 8 is a flowchart similar that of FIG. 5 showing the operation of an apparatus for detecting rammer tip-over according to a second embodiment of this invention, and FIG. 9 is a time chart showing inventors' experimental data like that of FIG. 6 for explaining the operation of FIG. 8.

An explanation of operation of the second embodiment, which is similar to that of the first embodiment follows: In S100, the engine speed is detected, and then, in S102, it is determined from the detected engine speed whether the engine 12 is operating greater (higher) than the idling speed, namely at the rammer working speed.

When the result in S102 is NO, the program returns to S100, and when YES proceeds to S104, in which it is determined whether the detected engine speed (more exactly, that detected in the current cycle; e.g., 1500 rpm) is at or below the threshold value (same value as in the first embodiment; e.g., 1500 rpm), i.e., it becomes equal to or smaller than the threshold value.

When the result in S104 is NO, the program returns to S100, and when YES, meaning that the engine speed was found to have fallen to or below the threshold, it proceeds to S106, in which it is determined whether the difference between the rammer working speed detected in a preceding time (e.g., 3600 rpm) and the speed detected in a current time (1500 rpm corresponding to the threshold) is equal to or greater than a predetermined value (e.g., 2100 rpm).

In other words, it is determined in S106 whether the detected engine speed becomes equal to or smaller than the threshold value by the predetermined value. Note that "current time" and "preceding time" mean program loop time, i.e., the execution cycles of the flowchart of FIG. 8.

When the result in S106 is NO, the program returns to S100, and when YES, it proceeds to S108, in which it is discriminated that the rammer 10 has tipped over, and to S110, in which the ignition of the engine 12 is cut off and the engine 12 is shut down.

The rammer 10 is discriminated to have tipped over when the result in S106 is YES because the inventors achieved this invention based on the finding that, as far as they could tell, when the rammer 10 tips over, then as shown at time t3 in the time chart of FIG. 9, the difference between the engine speed detected in the preceding cycle (rammer working speed; e.g., 3600 rpm) and the engine speed detected in the current cycle (threshold value; e.g., 1500 rpm) is equal to or greater than a predetermined value (e.g., 2100 rpm), i.e., the detected engine speed decreases a predetermined speed or greater (in other words, through a predetermined speed range or by a predetermined speed) to fall to or below the threshold.

The remaining processing steps shown in the flowchart of FIG. 9 are no different from those of the first embodiment.

Being configured as set out in the foregoing, the apparatus for detecting rammer tip-over according to the second embodiment makes it possible to detect engine speed with an already existing sensor used for control of the engine 12, so that the inconvenience of requiring a dedicated sensor does not arise, while it also makes it possible to detect tip-over of the rammer 10 still more accurately because a configuration is adopted whereby tip-over of the rammer 10 is detected and the engine 12 is shut down when the detected engine speed is discriminated to have fallen a predetermined speed or greater to or below the threshold set lower than the idling speed.

As stated in the above, the first and second embodiments are configured to have an apparatus and a method for detecting tip-over of a rammer (10) equipped with an internal combustion engine (12), a crankcase (10a) accommodating an output shaft rotatably connected to the engine, a movable unit (10b) accommodating a converter mechanism for converting rotation of the output shaft to vertical motion of a movable member in a gravitational direction, a tamping shoe (10c) connected to the movable unit, and a handle (10d) operable by an user, and adapted to thrust upward in the gravitational direction by the vertical motion of the movable member and go into a free fall to compact a ground surface with resulting impact force acting on the tamping shoe, characterized by: an engine speed detection unit (70a, S10, S100) that detects a rotational speed of the engine (12); a rammer tip-over discrimination unit (70b, S12 to S16, S102 to S108) that determines whether the detected engine speed becomes equal to or smaller than a threshold value set lower than an engine idling speed when the engine has been operated at a rammer working speed set greater than the engine idling speed, and discriminates that the rammer has tipped over if the detected engine speed becomes equal to or smaller than the threshold value; and an engine shutdown unit (70c, S18, S110) that shuts down the engine when it is discriminated that the rammer has tipped over.

Thus, the apparatus and method for detecting rammer tip-over is configured to detect engine speed, determine in response to the engine being operated at a rammer working speed exceeding idling speed whether the detected engine speed has fallen to or below the threshold set at a value lower than the idling speed, and respond to the detected engine speed being determined to have fallen to or below the threshold by discriminating that the rammer 10 has tipped over and shutting down the engine 12, thereby enabling prompt and accurate rammer tip-over detection and engine shutdown without need for a dedicated sensor.

Specifically, the inventors achieved this invention upon discovering that when a rammer tips over, the engine speed sharply decreases from the rammer working speed to or below the threshold set at a value lower than the idling speed. The sharp decline of the engine speed immediately after tip-over is thought to occur owing to the load produced as a result of the motion of the movable unit kicking the tamping shoe 10c into the ground surface, using the handle 10d as the axis.

Accordingly, the inconvenience of requiring a dedicated sensor does not arise because the engine speed can be detected by an already existing sensor used for engine control, while it is also possible to promptly and accurately detect rammer tip-over and promptly shut down the engine 12 because, based on the foregoing findings, a configuration is adopted whereby rammer tip-over is detected and the engine 12 is shut down when the detected engine speed is determined to have fallen to or below the threshold set at a value lower than the idling speed.

Moreover, when the rammer 10 is operating at a rammer working speed, tip-over of the rammer is detected by determining whether the engine speed has fallen to or below the threshold, and therefore, in a case where the operator deliberately lays the idling rammer 10 on its side for maintenance or the like, the engine 12 is not stopped owing to a false tip-over decision, thus ensuring that unnecessary tasks like engine restarting are avoided.

In the apparatus and method, the rammer tip-over discrimination unit determines whether the detected engine speed becomes equal to or smaller than the threshold value by a predetermined value when the detected engine speed becomes equal to or smaller than the threshold value, and discriminates that the rammer has tipped over if the detected engine speed becomes equal to or smaller than the threshold value by the predetermined value (70b, S12 to S16).

Thus, the apparatus and method for detecting rammer tip-over is configured to determine whether a detected engine speed has fallen to or below the threshold and discriminate that the rammer 10 has tipped over in response to the detected engine speed being determined to have fallen the predetermined speed or greater to or below the threshold, i.e., the inventors achieved this invention upon discovering that when a rammer tips over, the engine speed sharply decreases a predetermined speed or greater from a rammer working speed to or below the threshold set at a value lower than an idling speed, so that, in addition to realizing the foregoing effects, rammer tip-over can be still more reliably detected.

In the apparatus and method, the rammer tip-over discrimination unit determines whether a difference of the engine speeds detected at a time (at current program loop) and detected at a time earlier than the time (at a preceding program loop) becomes equal to or greater than the predetermined value when the detected engine speed becomes equal to or smaller than the threshold value, and discriminates that the rammer has tipped over if the difference of the detected engine speeds becomes equal to or greater than the predetermined value (70b, S102 to S108).

With this, in addition to realizing the foregoing effects, rammer tip-over can be still more reliably detected.

It should be noted that in the foregoing, the structure of the rammer 10 is not limited to the illustrated example but is suitable for this invention insofar as the converter mechanism that converts to the vertical motion of the movable member is equipped with an accommodated movable unit and a tamping shoe.

Moreover, although the idling speed, rammer working speed, threshold and the like were stated as specific speed values, they are of course examples.

Japanese Patent Application No. 2012-207469 filed on Sep. 20, 2012, is incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for detecting tip-over of a rammer equipped with an internal combustion engine, a crankcase accommodating an output shaft rotatably connected to the engine, a movable unit accommodating a converter mechanism for converting rotation of the output shaft to a linear motion of a movable member in a direction of the gravitational force, a tamping shoe connected to the movable unit, and a handle operable by an user, and adapted to thrust against the gravitational force by the linear motion of the movable member and go into a free fall to compact a ground surface with resulting impact force acting on the tamping shoe, comprising:

an engine speed detection unit that detects a rotational speed of the engine;

a rammer tip-over discrimination unit that determines whether the detected engine speed becomes equal to or smaller than a threshold value set lower than an engine idling speed when the engine has been operated at a rammer working speed set greater than the engine idling speed, and discriminates that the rammer has tipped over if the detected engine speed becomes equal to or smaller than the threshold value;

and an engine shutdown unit that shuts down the engine when it is discriminated that the rammer has tipped over, wherein, when the detected engine speed becomes equal to or smaller than the threshold value and the rammer tip-over discrimination unit discriminates that the rammer has tipped over, the detected engine speed repeats a behavior of rising toward the rammer working speed and reversing to fall toward the threshold value again until the engine shutdown unit shuts down the engine.

2. The apparatus according to claim 1, wherein the rammer tip-over discrimination unit determines whether the detected engine speed becomes equal to or smaller than the threshold value by a predetermined value when the detected engine speed becomes equal to or smaller than the threshold value, and discriminates that the rammer has tipped over if the detected engine speed becomes equal to or smaller than the threshold value by the predetermined value.

3. The apparatus according to claim 2, wherein the rammer tip-over discrimination unit determines whether a difference of the engine speeds detected at a time and detected at a time earlier than the time becomes equal to or greater than the predetermined value when the detected engine speed becomes equal to or smaller than the threshold value, and discriminates that the rammer has tipped over if the difference of the detected engine speeds becomes equal to or greater than the predetermined value.

4. An apparatus for detecting tip-over of a rammer equipped with an internal combustion engine, a crankcase accommodating an output shaft rotatably connected to the engine, a movable unit accommodating a converter mechanism for converting rotation of the output shaft to a linear motion of a movable member in a direction of the gravitational force, a tamping shoe connected to the movable unit, and a handle operable by an user, and adapted to thrust against the gravitational force by the linear motion of the movable member and go into a free fall to compact a ground surface with resulting impact force acting on the tamping shoe, comprising a pulsar coil and a microcomputer, the pulsar coil producing an output indicating a rotational speed of the engine and sending the output to the microcomputer, the microcomputer being programmed to:
  calculate the rotational speed of the engine based on the output sent by the pulsar coil;
  determine whether the calculated engine speed becomes equal to or smaller than a threshold value set lower than an engine idling speed when the engine has been operated at a rammer working speed set greater than the engine idling speed;
  discriminate that the rammer has tipped over if the calculated engine speed becomes equals to or smaller than the threshold value; and
    shut down the engine when it is discriminated that the rammer has tipped over,
  wherein, when the detected engine speed becomes equal to or smaller than the threshold value and the microcomputer discriminates that the rammer has tipped over, the detected engine speed repeats a behavior of rising toward the rammer working speed and reversing to fall toward the threshold value again until the engine shutdown unit shuts down the engine.

5. The apparatus according to claim 4, wherein the microcomputer is programmed to determine whether the detected engine speed becomes equal to or smaller than the threshold value by a predetermined value when the detected engine speed becomes equal to or smaller than the threshold value, and discriminate that the rammer has tipped over if the detected engine speed becomes equal to or smaller than the threshold value by the predetermined value.

6. The apparatus according to claim 5, wherein the microcomputer is programmed to determine whether a difference of the engine speeds detected at a time and detected at a time earlier than the time becomes equal to or greater than the predetermined value when the detected engine speed becomes equal to or smaller than the threshold value, and discriminate that the rammer has tipped over if the difference of the detected engine speeds becomes equal to or greater than the predetermined value.

7. A method for detecting tip-over of a rammer equipped with an internal combustion engine, a crankcase accommodating an output shaft rotatably connected to the engine, a movable unit accommodating a converter mechanism for converting rotation of the output shaft to a linear motion of a movable member in a direction of the gravitational force, a tamping shoe connected to the movable unit, and a handle operable by an user, and adapted to thrust against the gravitational force by the linear motion of the movable member and go into a free fall to compact a ground surface with resulting impact force acting on the tamping shoe, comprising the steps of:
  detecting a rotational speed of the engine;
  determining whether the detected engine speed becomes equal to or smaller than a threshold value set lower than an engine idling speed when the engine has been operated at a rammer working speed set greater than the engine idling speed;
  discriminating that the rammer has tipped over if the detected engine speed becomes equal to or smaller than the threshold value; and
  shutting down the engine when it is discriminated that the rammer has tipped over,
  wherein, when the detected engine speed becomes equal to or smaller than the threshold value and it is discriminated that the rammer has tipped over, the detected engine speed repeats a behavior of rising toward the rammer working speed and reversing to fall toward the threshold value again until the engine shutdown unit shuts down the engine.

8. The method according to claim 7, wherein the step of determining determines whether the detected engine speed becomes equal to or smaller than the threshold value by a predetermined value when the detected engine speed becomes equal to or smaller than the threshold value, and the step of discriminating discriminates that the rammer has tipped over if the detected engine speed becomes equal to or smaller than the threshold value by the predetermined value.

9. The method according to claim 8, wherein the step of determining determines whether a difference of the engine speeds detected at a time and detected at a time earlier than the time becomes equal to or greater than the predetermined value when the detected engine speed becomes equal to or smaller than the threshold value, and the steps of discriminating discriminates that the rammer has tipped over if the difference of the detected engine speeds becomes equal to or greater than the predetermined value.

* * * * *